Jan. 10, 1928.
R. C. SIMMONS
1,655,439
CUTTING SHEET MATERIAL
Filed May 9, 1923     8 Sheets-Sheet 1
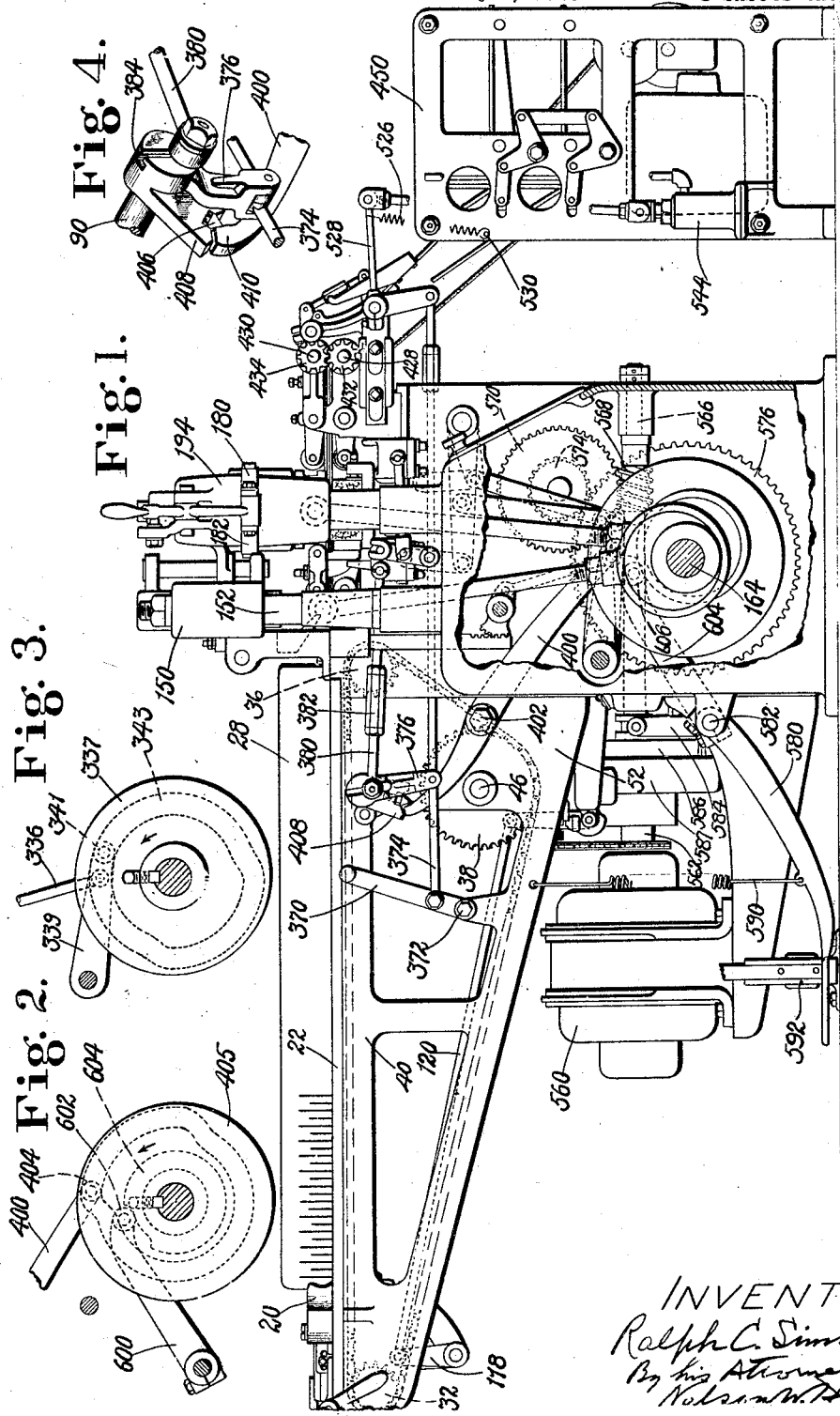
INVENTOR-
Ralph C. Simmons
By his Attorney
Nelson W. Howard

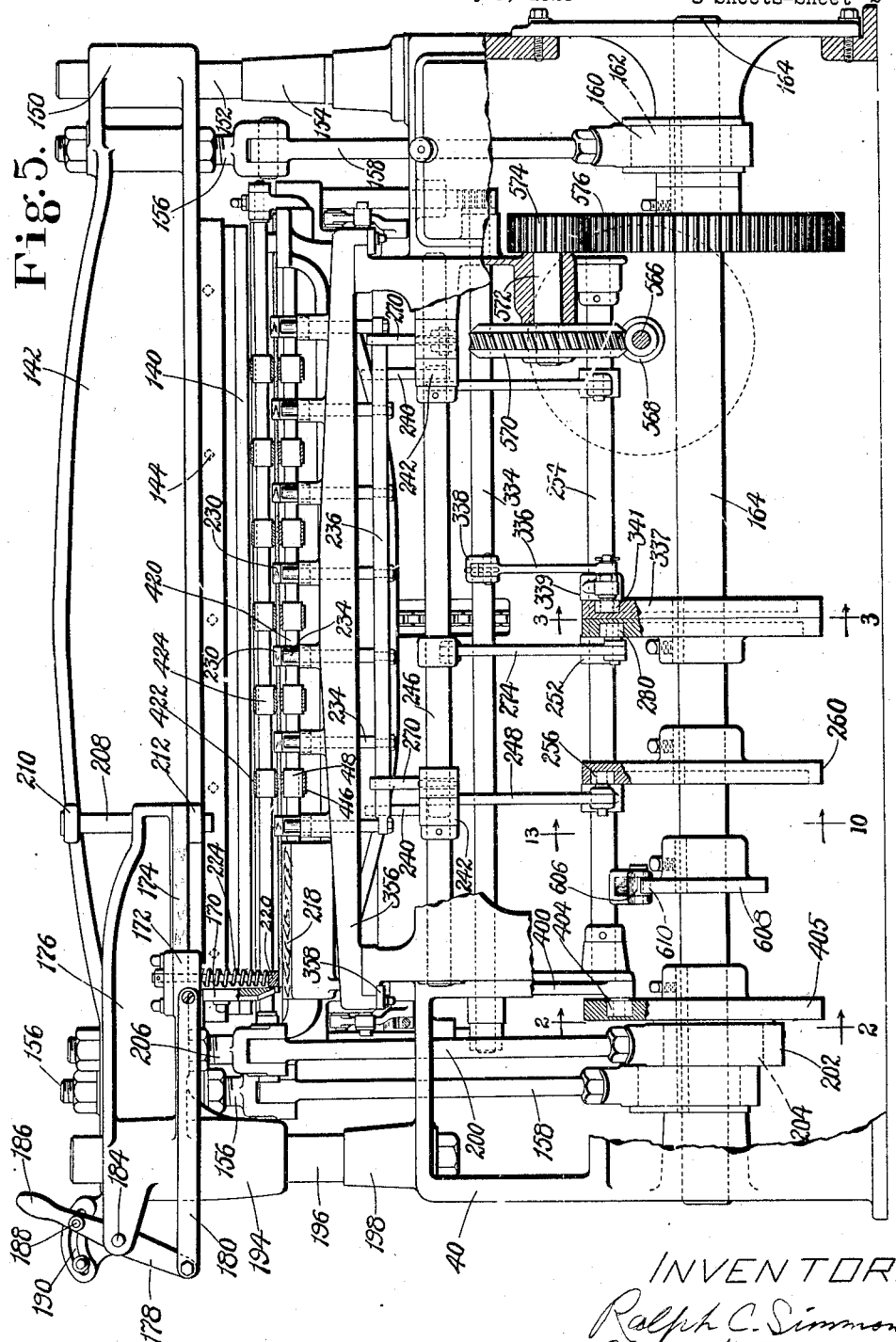

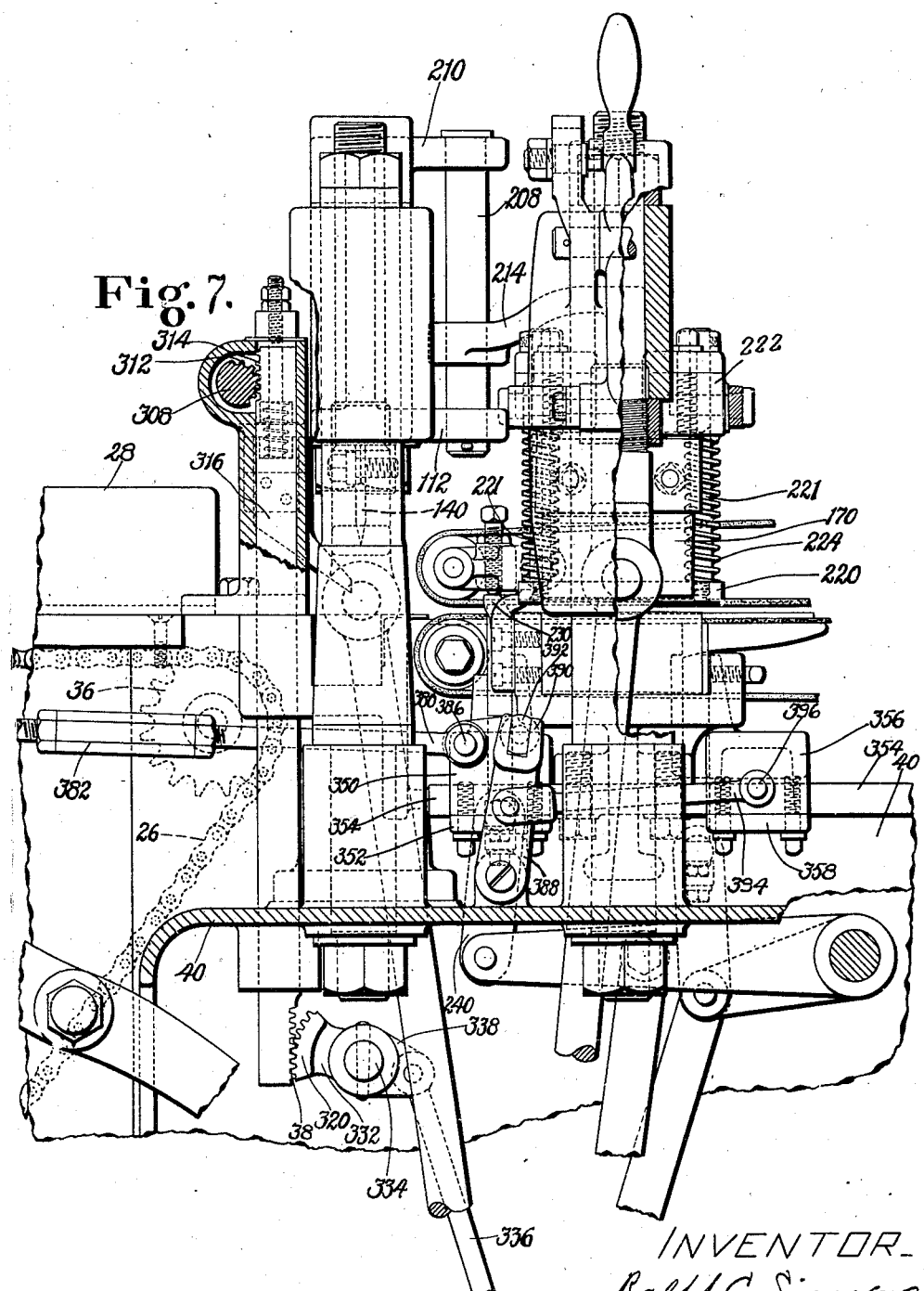

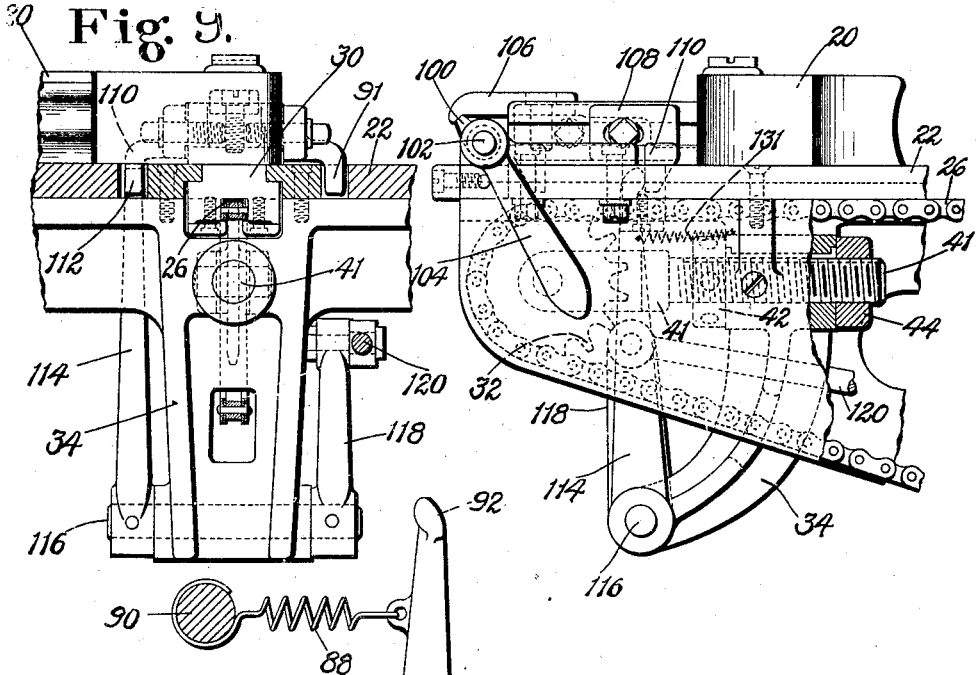
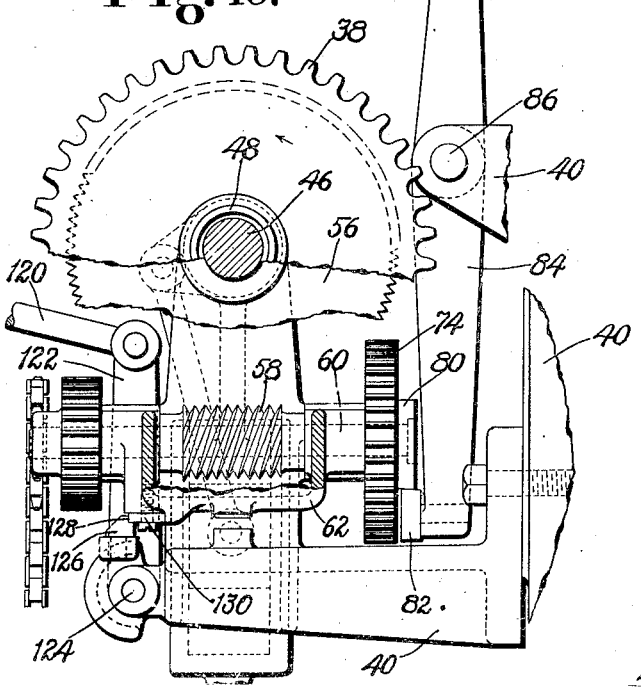

Jan. 10, 1928.
R. C. SIMMONS
1,655,439
CUTTING SHEET MATERIAL
Filed May 9, 1923
8 Sheets-Sheet 6
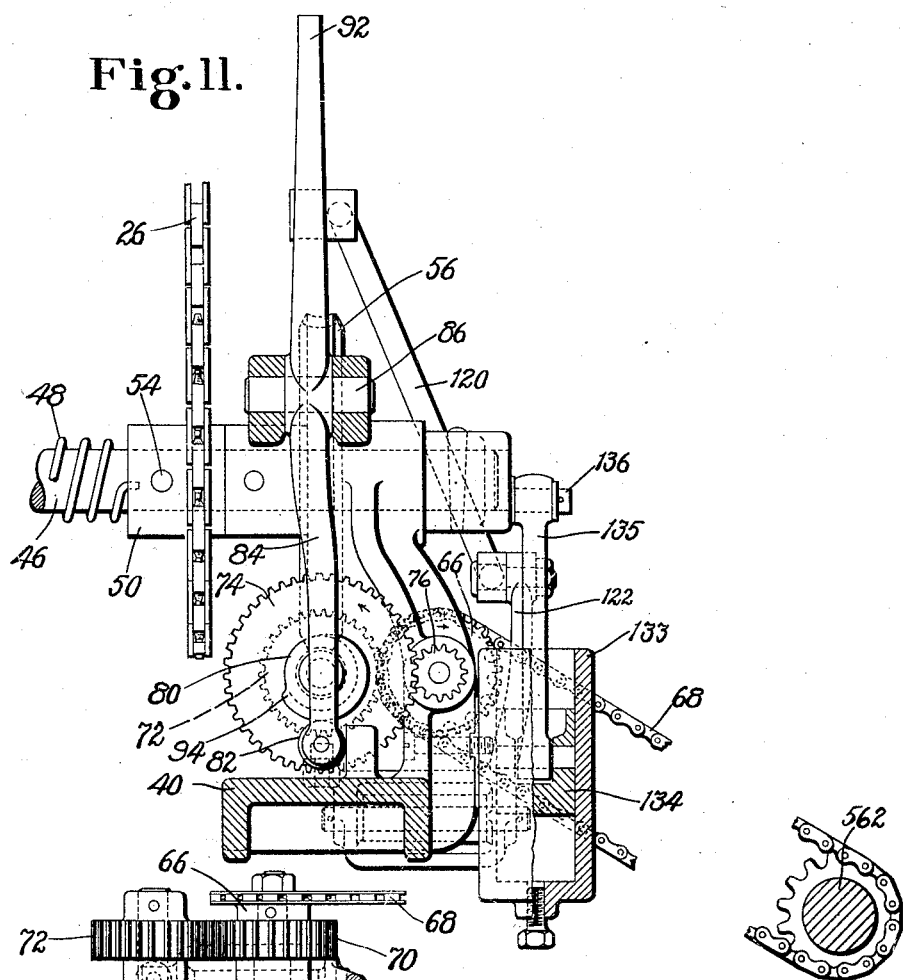
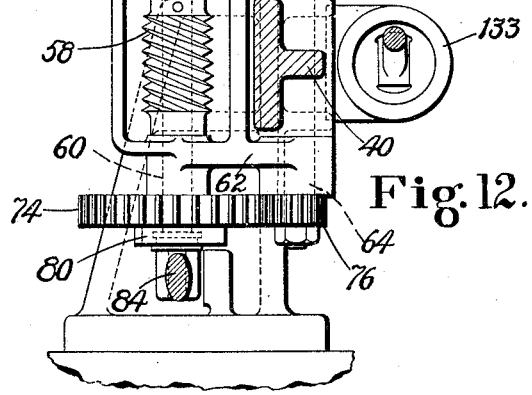
INVENTOR_
Ralph C. Simmons
By his Attorney,
Nelson W. Howard Jan. 10, 1928.
R. C. SIMMONS
CUTTING SHEET MATERIAL
Filed May 9, 1923
1,655,439
8 Sheets-Sheet 7
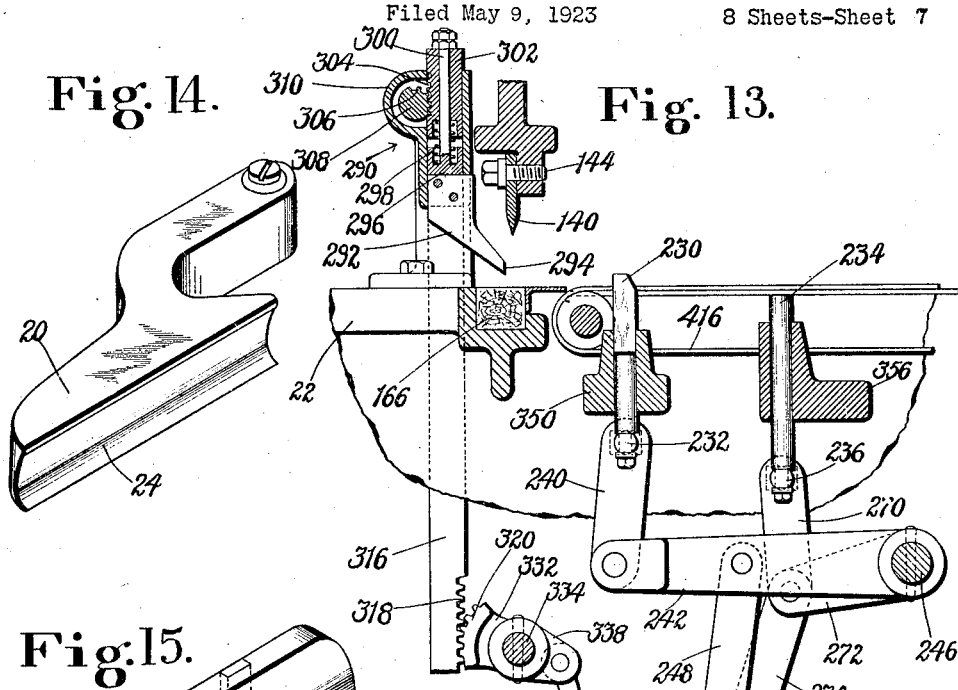
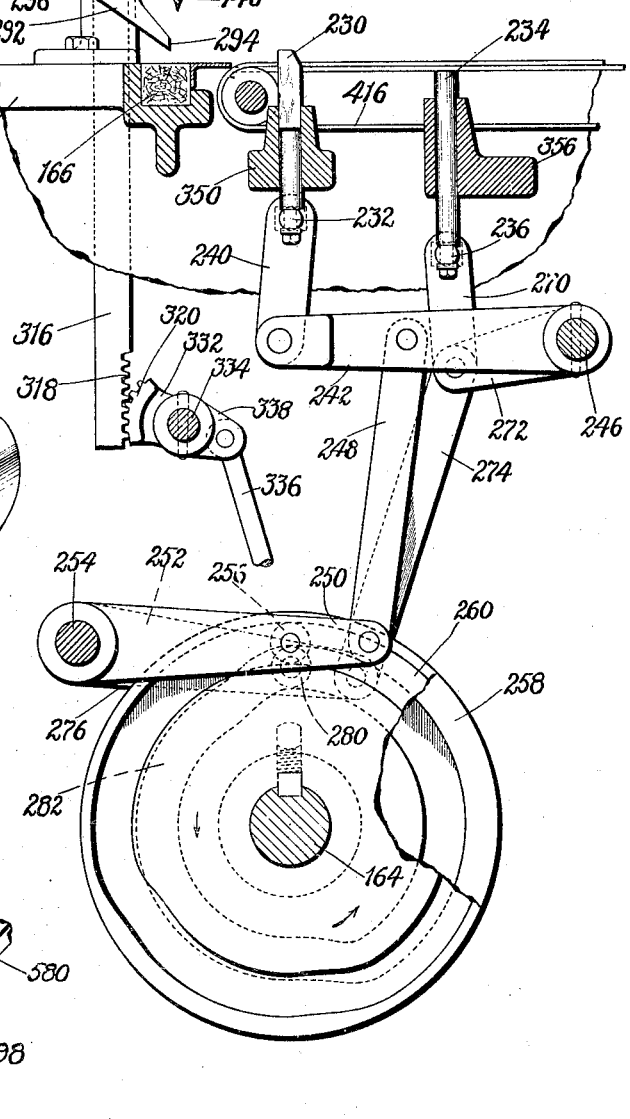
INVENTOR.
Ralph C. Simmons
By his Attorney
Nelson H. Howard

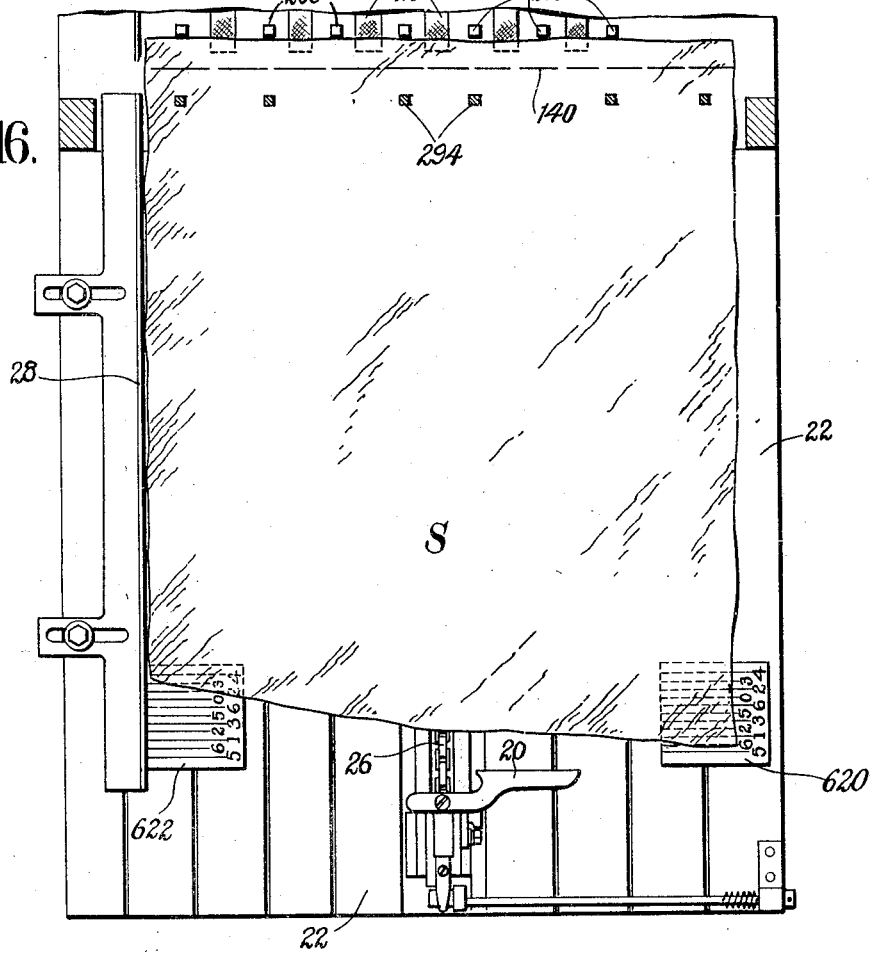
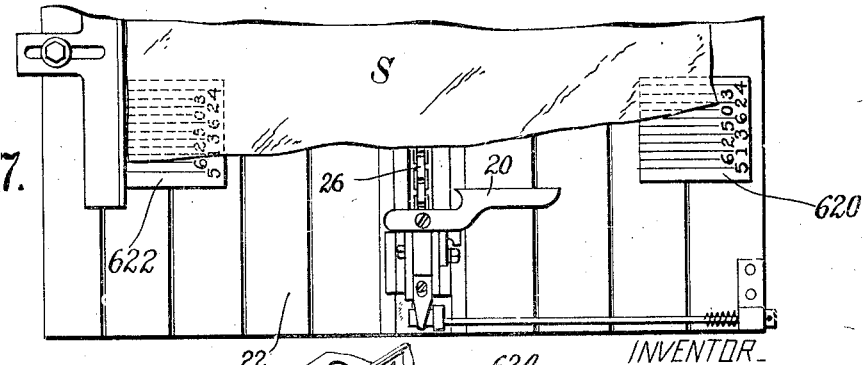
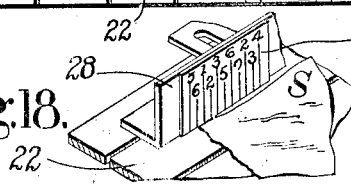

Patented Jan. 10, 1928.

1,655,439

UNITED STATES PATENT OFFICE.

RALPH C. SIMMONS, OF BEVERLY, MASSACHUSETTS, ASSIGNOR TO UNITED SHOE MACHINERY CORPORATION, OF PATERSON, NEW JERSEY, A CORPORATION OF NEW JERSEY.

CUTTING SHEET MATERIAL.

Application filed May 9, 1923. Serial No. 637,788.

This invention relates to cutting sheet material into strips and more particularly to cutting strips of various widths and stacking them so that the strips of a given width are all in one pile.

It is an object of the invention to provide a machine for cutting sheet material into strips of various desired widths in which provision will be made for rejecting strips below a minimum standard width, and also for discarding the waste pieces, whether they occur at the front or rear end of the sheet or at both ends, so as to insure that only perfect strips of material of the desired width or widths appear stacked at the discharge station. It is a further object of the invention to provide for a second operation on the sheet material without slowing up the speed of the machine or restricting the output per unit of time.

Accordingly, as exemplified in the illustrative machine, features of the invention consist in an improved organization comprising a cutter for cutting sheet material into strips and also a second cutter which cuts a piece from the end of each strip to confer a predetermined edge contour on one end of each strip. Conveniently the cutters operate to sever strips from the sheet material and to butt the strips in succession as they pass beyond the strip severing position.

For positioning the sheet material for the operation of the cutters there is provided a gage mechanism comprising gages projectable into the path of the moving sheet material to locate the sheet first for the stripping operation, and subsequently to locate each strip for the butting operation.

In the illustrated organization, in addition to means for cutting strips of various widths from sheet material and stacking the same in separate piles in accordance with the width of the strips, there is provided, according to this invention, an improved control mechanism by which the operator may determine the station at which the strips being cut will be discharged. Preferably, and in the construction shown, the control mechanism is connected to shift the gage mechanism to determine, at the will of the operator, the width of the strip to be cut from the sheet and at the same time control the delivery of those strips of a given width to the proper discharge station for the stack of strips of that width. As illustrated there is also preferably provided means for insuring that the control mechanism has been properly set by the operator and hence that the gage has been moved to its proper gaging position, the purpose being to preclude the possibility of cutting strips of a width other than the desired standard widths. This means is preferably automatic in its operation and in the construction shown is connected to a shunt device for determining selectively the discharge stations for the strips of various widths.

The invention contemplates also the provision of means for rejecting or discarding strips below the minimum standard width for which the machine is set. As illustrated this means comprises a shutter mechanism adapted to be operated by strips of standard widths. Conveniently, the shutter mechanism is so spaced from the cutting machine that the scrap pieces drop from the path of the strips.

Another important feature of the invention relates to improved means for feeding the sheet material to the stripping cutter, the said feeding means being so constructed as to leave the feed table unobstructed for the reception of the sheet material and so arranged as to be operative, at the will of the operator, to move the sheet into contact with the gages for the stripping operation and to hold the material with a yielding pressure against said gages.

Other features of the invention and novel combinations of parts will be described in the detailed specification and pointed out in the appended claims.

In the drawings,

Figure 1 is a view in side elevation of a cutting machine showing one embodiment of the invention;

Figs. 2 and 3 show the cams for operating the gage mechanisms;

Fig. 4 is a detail of the shifting mechanism for the gages;

Fig. 5 is a view of the cutting mechanisms of the machine partly in section along a plane extending transversely of the machine just to the rear of the second set of gages;

Fig. 7 is an enlarged side view and partly in section of the middle portion of the machine showing the cutters and the gages;

Fig. 8 is a view in side elevation and partly in section of the extreme left end of the machine shown in Fig. 1 designed to show part of the sheet feeding mechanism;

Fig. 9 is a detailed view of parts shown in Fig. 8, taken along a line extending transversely of Fig. 8 and looking to the left in said figure;

Fig. 10 is a detail view of the operating mechanism for the sheet feeding means;

Fig. 11 is a view of the parts shown in Fig. 10 looking from the right in said figure;

Fig. 12 is a further detail of parts of the clutch operating means shown in Figs. 10 and 11;

Fig. 13 is a view in side elevation and partly in section disclosing the gage mechanisms and the operating means therefor;

Fig. 14 is a perspective view of the feeder member for the sheet material;

Fig. 15 is a detail view of a treadle locking means; and

Figs. 16, 17 and 18 show features of the table upon which the sheet material is placed preparatory to the cutting operation.

Figure 6:
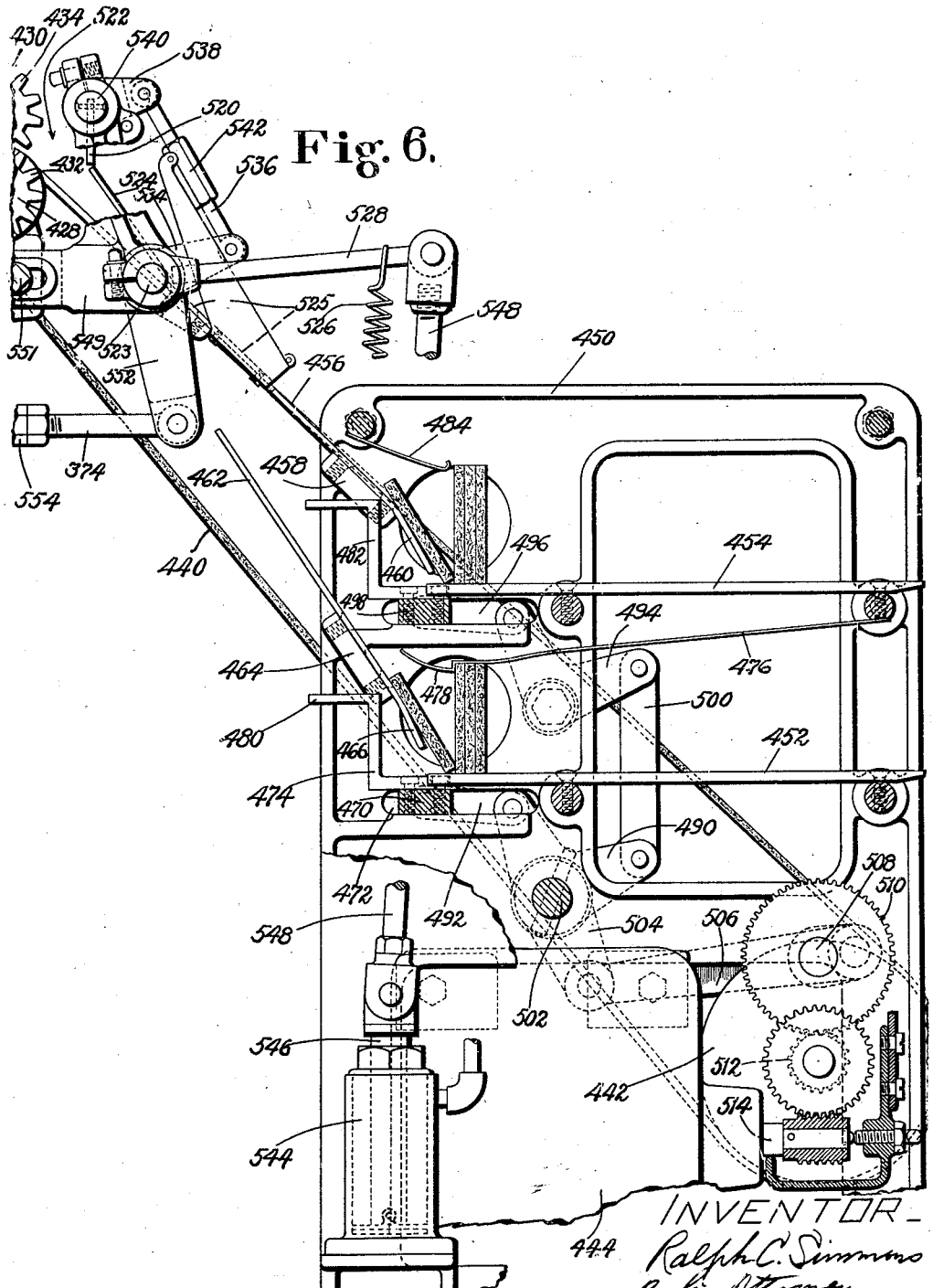
Fig. 6 is a view in side elevation and partly in section of the delivery end of the machine showing the strip stacking mechanism.

In the illustrated machine there is preferably provided means for feeding the sheet material to the cutting means, the said means comprising, as shown, a member 20 (Fig. 1) movable along the table 22 to advance the sheet into the field of cutting operations, the said feed member being preferably formed as best shown in Fig. 14 with a sheet engaging face 24 concaved slightly to prevent upward displacement of the rear edge of the sheet while the feed member is exerting pressure thereon in the feeding direction. As will be evident from an inspection of Figs. 9 and 14 the feed member 20 is extended to one side only with respect to its point of attachment with the feed chain 26, the purpose of such an arrangement being to keep the sheet, as it is being fed, in contact with the gage plate 28 (Fig. 1) which is at the far edge of the table 22 and on the other side of the chain 26 with respect to the feed member 20. As shown, there is firmly clamped to the chain 26 a block 30 (Fig. 9) having a portion slidable in a groove extending longitudinally of the table 22 and to which the feed member 20 is directly secured. For supporting and operating the chain 26 there is provided a sprocket wheel 32 (Figs. 1 and 8) mounted adjustably in a bracket 34 at the front end of the table, and also a sprocket wheel 36, shown in dotted lines in Figs. 1 and 7 of the drawings, mounted upon a shaft having fixed bearings in the machine frame 40. The two sprocket wheels 32 and 36 support the chain 26 and guide its upper run in a path parallel with the slot in the table 22. Intermediate between the sprocket wheels 32, 36 is the sprocket wheel 38 (Fig. 1) by which the chain is operated alternately in opposite directions, first to move the feed member 20 toward the cutting means and subsequently to return the feed member 20 to its initial position as a preliminary to further feeding operations. In order that the chain 26 may be readily assembled with and removed from the sprocket wheels and kept in proper tension the sprocket wheel 32 is carried at the end of a bar 41 (Fig. 8) which passes slidably through an opening in the bracket 34 and is engaged by two nuts 42, 44 upon a screw threaded portion of the bar to adjust the bar and to hold it fixedly in properly adjusted position. As shown, the sprocket wheel 38 is mounted fixedly upon a shaft 46 (Fig. 1) having bearings in the frame 40 of the machine, the said shaft being operated in a direction to cause feeding movement of the feeder member 20 by a relatively heavy spring 48 (Figs. 10 and 11) having one end fixedly secured to a hub 50 of the sprocket wheel 38 and its other end fixedly attached to a projection on the inside of the side wall 52 (Fig. 1) of the machine frame 40. It will be understood that when the sprocket wheel 38 is driven through power means in a direction to return the feeder member 20 to initial position the spring 48 is wound up, whereby sufficient energy is stored up in the spring to effect the proper feeding of the sheet material to the cutting means. Since the sprocket wheel 38 is pinned to the shaft 46, as indicated at 54 (Fig. 11), both the shaft and the sprocket wheel are operated by the spring 48 and furthermore, power applied to the shaft 46 will effect corresponding movement of the sprocket wheel 38. Secured to the shaft 46 is a worm gear 56 (Figs. 10 and 11) which is at certain times in mesh with a worm 58 secured to a shaft 60 which is mounted in a bracket 62 (Figs. 10 and 12) pivoted upon a shaft 64 carried by bearings provided in the machine frame 40. Fixed to one end of the shaft 64 is a sprocket wheel 66 about which passes a sprocket chain 68 through which power is transmitted for driving the shaft 64. Secured to the shaft 64 is a gear wheel 70 constantly in mesh with a gear 72 fixed to the shaft 60 so that the latter shaft is positively driven from the former. At their other ends the shafts 60 and 64 carry gears 74 and 76, respectively, in mesh with each other, the said gear 74 being loosely mounted on its shaft so that it is positively driven from the gear 76 and at a lower speed than the shaft 60. Fixedly secured to one side of the gear 74 is a cam wheel 80 (Figs. 10, 11 and 12) and located below the said cam wheel is a roll 82 pivoted upon the lower end of the lever 84, arranged to be rocked about its pivot 86 by means hereinafter described. Ordinarily, the roll 82 is maintained in a plane at one side of the cam wheel 80 through the operation of a spring 88 attached at one end to the upper end of the lever 84 and at its other end to a shaft 90 fixed against lateral movement on the machine frame. When the feeder member 20 has reached its limit of movement in the feeding direction, a projection 91 (Fig. 9) thereon contacts with the upper end 92 of the lever 84, swinging the lever about its pivot 86 and projecting the roll 82 into the path of the cam 94 (Fig. 11) on the cam wheel 80. Since the shaft 60 and the cam wheel 80 are constantly driven through the train of gears above described, the cam 94 is almost instantly operated through the vertically stationary roll 82 to lift the bracket 62, thus carrying the worm 58 into mesh with the teeth on the worm gear 56 and in this manner power is transmitted to rotate the shaft 46 in a direction to run the feeder member 20 back to its initial position in which it is shown in Fig. 1 of the drawings. The bracket 62 is maintained in raised position for the required time through latching means hereinafter described. As before stated this rotation of the shaft 46 winds up the spring 48 and stores up the necessary energy for rotating the shaft and sprocket wheel 38 in the opposite direction. In order that the feeder 20 and the chain 26 may be retained with the feeder member in position to engage the rear end of a sheet placed upon the table 22, there is provided a latching means comprising a movable stop or abutment 100 (Fig. 8) secured to a shaft 102 mounted in bearings at the extreme front end of the table and provided at its free end with a handle 104 so that the latch may be operated by the operator to release the feeder member 20 and its operating chain 26. At the same time that a latch finger 106, carried fixedly by a block 108 secured to the chain 26, engages with the abutment or stop 100, an arm 110 on the block 108 engages with the upper end 112 of a lever 114 (Figs. 8 and 9) secured to a rock shaft 116 which carries at its other end an arm 118 having pivoted to its free end a rod 120. The other end of this rod 120 is connected to the upper end of an arm 122 (Fig. 10) fixedly secured to a rock shaft 124 which carries fixedly secured thereto a latch 126 having a shoulder 128 adapted to engage under a plate 130 secured to the movable bracket 62 at a point below the shaft 60, the arrangement being such that when the rod 120 is moved, through operation of the lever arm 114, the latch 126 is withdrawn from below the plate 130, permitting the bracket 62 to drop by gravity, thus removing the worm 58 from meshing contact with the worm gear 56 and terminating the positive driving connection between the train of gears above described and the shaft 46. The next time the bracket 62 is lifted, the latch 126 moves under the plate 130 to hold up the bracket and maintain gears 56 and 58 in mesh, movement by the latch 126 being caused by spring 131 operating on rod 120. It will be understood, then, that the power means which positively rotates the shaft 46 in a direction to return the feeder member 20 to its initial position stores up the energy in the spring 48 and is then thrown out of operation at the same instant that the chain 26 and feeder member 20 are locked in work receiving position through the operation of the latch parts 100, 106.

In order to prevent injury to the spring operated feeder member 20 and to parts operated thereby in case the latch 100 is moved to releasing position when no work is in the machine, a dash pot 133 is provided (Fig. 11) in which works a piston 134 connected by a link 135 to a pin 136 mounted eccentrically on the end of the shaft 46. Hence the rotation of the shaft is retarded at regular intervals, thus making of the dash pot a safety device.

The means for cutting sheet material into strips and for butting the strips comprises, in the construction shown, a straight-edged cutter 140 (Figs. 5, 7 and 13) secured to a movable cross head 142 by bolts 144. As shown, the cross head 142 is provided at each end with a bearing 150 (Fig. 5) slidable on a relatively heavy post 152 which is fixed within a bearing 154 on the frame of the machine, the purpose of the posts being to restrict the cross head 142 to movement in a vertical plane. Adjustably secured to each end of the cross head 142 adjacent to the bearing 150 is a heavy bolt 156, the lower end of which is bifurcated and pivotally receives the upper end of a pitman 158, the lower end of which is secured to an eccentric strap 160 which surrounds an eccentric 162 on a shaft 164. It will be understood that the cross head 142 is reciprocated from the shaft 164 through the described connections comprising the pitmans 158. For co-operation with the cutter 140 there is provided a cutting block 166 (Fig. 13) which may be of wood and rectangular in cross section so that it may be adjusted to bring one side after another in position to co-operate with the cutter. After the strips have been cut from the sheet material they are located for the abutting operation which, in the construction shown, is performed by a cutter 170 (Figs. 5 and 7) which may have a straight or a curved cutting edge accordingly as it is desired to cut a straight edge on the end of the strip, or a curved edge. Conveniently, the cutter 170 is adjustably bolted to a carrier 172 which is slidable along a track 174 on a head 176. For adjusting the carrier 172, and also the cutter, and for holding the parts in adjusted position there is provided a lever 178 connected to the carrier by a link 180 (Fig. 5) extending along one side of the head 176 and a similar link 182 (Fig. 1) extending along the other side of the head. For the convenience of the operator the lever 178, which is pivoted at 184 to the head 176 is provided with a handle 186 by which the lever may be operated after loosening a bolt 188 which extends through the lever and through a slot 190 concentric with respect to the pivot 184. After adjustment has been made the bolt 188 is again tightened to hold the lever and therefore the carrier 172 in adjusted position. Preferably the head 176 is mounted and operated in a manner similar to that of the cross head 142, according to which the said head 176 is provided with a bearing 194 slidable on a post 196 fixed in a bearing 198 in the machine frame 40, the purpose of the post 196 being to restrict the head 176 to movement in a vertical plane. For reciprocating the head 176 there is provided a pitman 200 extending upwardly from an eccentric strap 202 which surrounds an eccentric 204 on the shaft 164, the pitman 200 being also attached pivotally within the forked lower end of a heavy bolt 206 fixedly and adjustably secured to the head 176. For preventing swinging movement of the head 176 about the axis of the post 196 there is provided a connection between the head 176 and some other part of the machine to prevent such turning movement. In the construction shown the cross head 142 is provided with a guide bar 208 (Figs. 5 and 7) held against vertical movement in bearings 210, 212 extending laterally from the cross head 142, the said guide rod 208 being slidably engaged by an arm 214 extending from and rigidly attached to the end of the head 176. It will be clear that, while the head 176 is thus tied to the cross head 142, relative movement between the head and cross head is provided for through the sliding connection between the bearing at the end of the arm 214 and the guide bar 208. For co-operation with the cutter 170 there is provided a cutter block 218 which may be of wood, as indicated in Fig. 5 of the drawings. Preferably also a presser foot 220 is provided to press upon the end of the strip adjacent to the cutter 170 to flatten out the same preliminarily to the cutting operation, and to hold the end of the strip against upward displacement as the cutter rises at the end of the operation. As shown most clearly in Fig. 7 of the drawings the presser foot 220 is carried by a couple of bars 221 rigidly secured at their lower ends to the presser foot and passing up into sockets in the socket member 222, springs 224 being provided in the sockets for yieldingly resisting upward movement of the presser foot which normally presents its lower surface in a plane below the edge of the cutter 170 so that it may contact with the work prior to the operation of the cutter and retreat relatively to the cutter during the advance of the latter in the cutting operation.

In the illustrated machine, means is preferably provided for locating the advance end of the sheet for the operation of the cutter 140, and other means for positioning each strip in succession for the operation of the butting cutter 170. In the construction shown a set of gages extending in a straight line parallel with the cutter 140 is provided for locating the forward end of the sheet of material, each of this set of gages being designated by reference character 230 (Figs. 5, 7, and 13). As shown, these gages are carried by a relatively light cross bar 232, the purpose of the lightness of weight of the cross bar being to reduce the possible back lash of the parts to a minimum during the operations of projecting the gages upwardly into the path of movement of the sheet and retracting the gages from said path of movement. For locating the strips successively in position for the operation of the cutter 170 there is provided a second set of gage pins 234 arranged in a row extending across the machine and parallel to the first set of gages. Preferably, the gages 234 are also connected to and operated from a cross bar 236 similar in all respects to the cross bar 232. It will be clear from an inspection of Fig. 13 of the drawings that the gage pins 230 are projected upwardly to position the sheet for the operation of the cutter 140 and that at this time the gage or gage pins 234 are retracted to permit the discharge of the strip which has just been operated upon by the butting cutter 170. Subsequently the gages or gage pins 234 will rise into the path of the strip which has just been cut by the cutter 140 and then the pins 230 will be retracted while the pins or gages 234 remain in operative position to receive and locate the strip released by the gage pins 230. This alternate projection and retraction of the gages 230 and 234 in timed relation with respect to each other is accomplished by operating mechanism which comprises cams in cam wheels secured to the shaft 164. As shown, the connections between the cross bar 232 and the operating cam for said cross bar comprises a pair of links 240 one at each end of the cross bar pivoted thereto and to the forked end of a lever arm 242 in turn loosely pivoted upon a shaft 246. Pivoted to an intermediate portion of the lever arm 242 is a link 248, the lower end of which is pivoted to an arm 250 loose on shaft 254 and operated by roll 256 on lever 250, said roll running in cam track 258 in cam wheel 260. The shaft 254 is parallel and in a plane above the shaft 164. At the end of the arm 252 is a roll 280 which runs in a cam groove 282 in the cam wheel 283 (Fig. 5). Similarly the cross bar 236 is operated by connections which comprise links 270 pivoted one at each end of the cross bar 236 and having their lower ends in turn pivoted to an arm 272 which is pinned to the shaft 246, one of the arms 272 having pivoted to its end also a link 274, the lower end of which is pivotally connected to the lever arm 252.

When the forward end of the sheet has been fed into contact with the set of gages 230 by the yieldingly operated feed member 20 the material is first pressed down upon the work table 20 by a presser-foot mechanism designated in general by the reference character 290 (Figs. 7 and 13). Preferably, and as shown, this mechanism comprises a plurality of presser members 292 having each a somewhat sharpened end 294 for engaging with the sheet to hold it against displacement as the cutter 140 moves upwardly after a cutting operation, the presser member serving also to flatten out the sheet prior to the cutting operation, so as to insure uniformity in the width of the material between the knife 140 and the gages 230. As shown, each presser member 292 comprises a body portion 296 which contains a socket for the lower end of a spring 298 and is provided with an extension in the shape of a bolt 300 which passes through a bore in a rack member 302 which also has a socket for the upper end of the spring 298, the said rack member 302 being spaced from the body portion 296 of the presser member 292 so that upon downward movement of the rack member 302 the spring 298 is compressed to force the presser member 292 yieldingly in a downward direction to engage the work. As shown, the rack member 302 is provided with rack teeth 304 which are constantly in mesh with corresponding rack teeth 306 on a rod 308 which extends transversely of the machine within a housing 310. At one end the rod 308 is provided with rack teeth 312 (Fig. 7) to engage rack teeth 314 on a slide bar 316, the lower end of which may be connected for operation of the slide bar to cause vertical reciprocations of the latter, the operating connections for this purpose comprising in the illustrative construction rack teeth 318 in mesh with teeth on a segmental rack 320 at one end of a lever 332 which is pinned to a shaft 334. For rocking the shaft 334 there is provided a rod 336 pivoted to an arm 338 extending laterally from the shaft, the lower end of the rod 336 being operated from the cam 337 on the main shaft 164, in properly timed relation with respect to the cross head 142 which carries the cutter 140, through an arm 339 carrying a roll 341 running in a cam path 343 in cam wheel 337. It will be clear that rotation of the rod 308 (Fig. 13) in a clockwise direction will result in projecting all of the presser members 292 downwardly to engage the work with yielding pressure and that upon rotation of the rod 308 in the reverse direction all the presser members will be simultaneously retracted so as to permit the sheet to be fed forward until its forward edge comes in contact with the gages 230.

Means is preferably provided for simultaneously adjusting both sets of gages 230, 234 in directions toward and away from the cutter 140. Adjustment of the gages 230 in directions toward and away from the cutter 140 results in changing the width of the strips severed from the sheets of material being operated upon. It is necessary then to adjust also the gages 234 and more particularly if the butting cutter has a curved cutting edge. In the construction shown the gages 230 which are supported by the cross bar 232 are supported and guided for lateral movement in the relatively heavy beam 350 (Figs. 7 and 13) in which each gage member 230 has its own socket in which it is restricted to sliding movement in a vertical direction. At each end of the beam 350 is a downwardly extending portion which carries a plate 352 adapted to engage under a flange 354 on the sides of the machine frame 40 so that the beam 350 is guided for lateral movement but is otherwise retained in proper position for guiding the gages 230 and supporting them against lateral movement except that of adjustment. Similarly the gages 234 pass through individual sockets in a beam 356 (Figs. 5, 7 and 13) extending transversely of the machine and provided with plates 358 similar to the plates 352 for engagement with the same flange 354 on the machine frame. For shifting the beams 350 and 356 in either direction along the flange 354 there is provided a manually operable lever 370 (Fig. 1) pivoted at 372 upon the machine frame 40 and having pivoted thereon one end of a rod 374 to which is pivotally connected a lever arm 376 at a point intermediate between the ends of the said rod 374 (Figs. 1 and 4). Lever arm 376 is pivoted upon a shaft 90 (Fig. 4) carried by bearings on the machine frame 40 and has pivoted thereto intermediate between its end a rod 380 which is extensible in length by means of a turn buckle 382 (Fig. 1). As shown, the rod 380 is adjustably connected to the lever 376 by means of a block slidable in a T-shaped slot 384 (Fig. 4), the said rod 380 being pivotally connected at its other end as at 386 to the beam 350 (Fig. 7). Pivoted upon a portion of the machine frame below the beam 350 is a lever 388, the upper end of which is bifurcated, as at 390, to receive the flattened end of a pivot pin 392 extending out from the end surface of the beam 350. Pivotally connected to the lever arm 388 intermediate between its ends is a link 394, the other end of which is pivoted at 396 to the beam 356. It will be clear that through the connections described movement of the hand lever 370 over to the extreme left in Fig. 1 will shift the gages toward the cutter 140 to cause cutting of the narrowest strips, whereas movement of the same hand lever to its extreme right will cause shifting of the gages to make the widest strip possible to the machine as constructed.

In order to correct misplacement of the gages should the operator leave them in some indeterminate position, it being obvious that the gage must always have a definite position in order to insure the cutting of a strip of predetermined standard width, means is provided which is automatically operative to insure that the gages will occupy one of their predetermined positions. In other words, if the operator has been careless or has inadvertently left the gage at an indeterminate position, the automatic means referred to will complete the movement to that position or return it to the nearest predetermined position, thus insuring the cutting of a useful strip of material, useful because of its width which corresponds to one of the sizes desired and for which the machine has been set through the adjustment of the turn buckle 382. As shown, this automatic means comprises a lever 400 (Figs. 1 and 4) pivoted at 402 on the machine frame and carrying a roll 404 for travel in a cam groove on the cam wheel 405 (Fig. 5) which operates to rock the lever 400 in a direction to move the upper end of said lever to the right in Fig. 1, this operation occurring before the descent of the cross head which carries the cutter 140, and before the operative movement of the presser foot mechanism. When the upper portion of the lever 140 moves to the right, as described, its end contacts with one side or the other of a V-shaped abutment 406 (Fig. 4) carried by an arm 408 which is integral with or fixedly attached to, the lever arm 376. It will be noted that the end 410 of the lever 400 has two surfaces inclined to each other at an angle of substantially 90° and that as the lever 400 is swung about its pivot point one or the other of these end surfaces will contact with one or the other of the inclined surfaces on the V-shaped abutment 406, thereby positively moving the arm 408 in one direction or the other to complete the movement of the lever arm 376 provided such arm has not been moved completely into one of its two possible positions in the construction shown. In order that the end 410 of the lever 400 may not be caught upon the point of the V-shaped abutment 406, the latter is mounted to yield slightly into its socket in the member 408, thus insuring that the lever end 410 will engage with one or the other of the inclined surfaces on the movable abutment 406.

Means is provided for moving the strips as they are severed from the sheet material away from the cutter and into position against the second set of gages 234 in which position the butting operation takes place, as before described. Subsequently, upon withdrawal of the gages 234 the finished strip is carried along to a discharge station by the means which will now be described. As shown, the feeding means for the strips comprises two sets of belts, one above and one below the plane of the table 22 (see Figs. 1, 5, 7 and 13). By selecting relatively narrow belts it is possible to provide a relatively large number of the gages 230 and 234 in between the belts and thus secure better control of the strips, it being obvious that the belts which engage the strips both on their upper and lower surfaces must exert a very considerable traction while they are still held by the respective sets of gages. As shown, lower belts 416 (Fig. 5) pass over crowned rollers 418 secured to a shaft 420 mounted at its ends in bearings in the machine frame. Likewise the upper belts 422 pass about similar rolls 424 secured to an upper shaft 426 mounted in bearings provided on the stationary machine frame. At the rear ends these belts pass over similar rolls carried respectively by shafts 428 and 430 (Fig. 1) which carry at their ends meshing gears 432 and 434, respectively, the lower shaft 428 being driven from a belt 440 (Fig. 6) which passes around a driven pulley 442 which is rotated through the gearing shown from a source of power furnished by a motor 444. It will be understood, however, that the belt 440 may be driven from or through connections provided with power from the main shaft 164 in the main machine. This will be the construction in case the stacking mechanism shown in Fig. 6 is not used as, for instance, when it is preferred to deliver all of the strips, whatever their length, upon the same support.

The preferred form of stacking mechanism for the strips is shown, in Figs. 1 and 6, to consist of a rectangular frame work 450 having a supporting shelf 452 for strips of one width and another supporting shelf 454 for strips of another width, the construction and arrangement in the present case being such that the wider strips are delivered to the upper shelf 454 and narrower strips to the lower shelf 452. Leading to the upper shelf 454 is an inclined slideway comprising a number of plates 456 in spaced relation to each other secured to an inclined bar 458 carried by the frame 450. The lower ends 460 of the plates 456 are bent downwardly away from the plane of the main portion thereof and end closely adjacent to the upper surface of the platform or support 454. Similarly a slideway composed of plates 462 leads to the lower platform or support 452, said plates being secured to a bar or block 464 similar to 458 and having their lower ends 466 bent away similarly to support the strips in co-operation with the platform 452 until the latter has been moved into the stack through means which will now be described. Mounted upon a bar 470 which is reciprocable along a guideway 472 provided in the ends of the frame 450 is an angular feed member 474 which is movable along a slot in the support or platform 452 for the stack of strips, the upright portion of the feed member 474 being operative to engage a freshly introduced strip and move the same to the right into contact with those which have preceded it and subsequently move all of the strips such a distance that a spring member 476 may engage its latching end 478 over the upper corner or edge of the strip just introduced by the feed member 474. It will be seen that the latch end 478 has a cam surface which lifts it to permit of the introduction of each succeeding strip. Preferably the slidable feed member 474 has a horizontal portion 480 which serves as a support for any strip coming down the slideway 462 while the feed member is in its advanced feeding position. Upon retraction of the feed member 474 to initial position shown in Fig. 6, the strip drops down promptly so that its lower end rests upon the platform or support 452. The parts of a feed member 482 for the upper stack of strips are the same in all important details as those described with respect to the lower feeder member 474. If desired, the upper retaining or latch member for the strips may be a short member 484 which thus leaves the larger part of the upper stack entirely unobstructed with respect to access from above. For reciprocating the feed members 474, 482 there is provided a pair of bell crank levers, the lower one 490 being pivotally connected at its upper end to a link 492 which is in turn pivoted to the feed member slide block 470. Another bell crank lever 494 is pivoted at its upper end to a link 496 which is in turn pivoted to a block 498 that carries the feeder member 482. Connecting the otherwise free ends of the bell crank levers 490, 494 is a link 500 by which power is transmitted from the lower bell crank lever 490, to the upper 494. Secured to a shaft 502 upon which the lower bell crank lever 490 is fixedly mounted is a lever arm 504 to the extremity of which is attached a pitman 506 pivoted at its other end to a bell crank on the shaft 508, the said shaft being driven through meshing gears 510, 512, the latter of which is driven through a train of gears leading back to an armature shaft 514 of the electric motor 444. It will be understood that the feeder members 474, 482 are constantly reciprocated while the machine is in operation so that any strips coming down either of the slideways 456, 462 are promptly stacked along with the strips which have preceded them. At the beginning of the stacking of strips a block of wood or other weighted member is placed on each stacking support 452, 454 in a position adjacent to the limit of the stroke of the feeder members 474, 482, such devices being quite commonly used to assist in the stacking of strips until a considerable number of strips have been cut and stacked when the blocks or weighted members may be removed.

Provision is preferably made for insuring that the scrap pieces, which are usually trimmed off from the front and rear edges of each sheet of material, are sent to the discard. The construction is preferably also such that any strip which is inadvertently cut of a width less than the narrowest of the standard strips being produced should also be rejected before it gets to stacking position on either of the platforms 452, 454. To attain these objects in the illustrative machine, a space is provided between the end rolls on the shafts 428, 430 and a shutter mechanism of which a shutter plate 520 (Fig. 6) is the most important element. When the scrap pieces come to this space, indicated by the reference character 522, they drop through to the floor beneath or to a receptacle placed there for the purpose of receiving them. Moreover, strips of such a width as to be unable to bridge the space 522 and operate the shutter 520 must also drop through into the discard. In other words, only those strips which are of a width to operate the shutter 520 by reason of the fact that they are still being moved along by the feed belts passing over the rolls 428, 430 will be passed on to stacking position. When a strip of one of the widths to which the machine has been set strikes the shutter plate 520 it swings the plate to the right (Fig. 6) and escapes down an adjustable slideway provided by plates 524, 525 and thence onto one of the slideways 456, 462. In order that the shutter plate 520 may offer the requisite resistance to keep out pieces of scrap or strips not up to the standard widths, it is connected up to a resistance member such, for instance, as a spring 526 which has one end attached to a rod 528 and its other end to a pin 530 (Fig. 1) on a stationary part such as the frame 450. The other end of the rod 528 is fixedly attached to a shaft 532, the shaft also fixedly carrying an arm 534 to the outer end of which is pivoted a rod 536, the upper end of which is pivotally attached to an arm 538 secured to a shaft 540 upon which the shutter plate 520 is adjustably mounted. Preferably the rod 536 is adjustable in length through the turn buckle 542. It will be understood then that when the shutter plate 520 is shoved to the right (Fig. 6) by an entering strip, such movement is resisted by the spring 526 which operates also to reclose the shutter as soon as the strip has passed. At the same time the shutter plate 520 moves to the right (Fig. 6) the plate 524 moves to the left due to rocking of the shaft 532, thus facilitating the entrance of the strip. In order to insure that the shutter will not be closed so promptly as to grip the strip, there is provided a retarding device which, in the construction shown, comprises a dash pot 544 of a well-known construction adapted to receive a plunger 546 connected by a rod 548 to the outer end of the rod 528, the construction and arrangement being such that downward movement of the rod 528, after it has been raised by the opening movement of the shutter 520 is retarded by the plunger 546 as it moves more or less slowly into the air compression chamber of the dash pot 544, it being understood that the resistance in the dash pot can be varied in a well-known manner. It will also be clear from the foregoing description that the shutter plate 520 can be adjusted by direct adjustment on the shaft 540 and also by adjusting the shaft 540 directly through the operation of the turn buckle 542 and in this way it is possible to make fine adjustments to secure the best working conditions for the parts. In order to take care of the widths of strips of standard sizes that it is desired the machine should cut and stack, the shutter plate can be adjusted bodily toward and from the rolls at the ends of the belts by adjusting bracket 549 and securing it in adjusted position by the bolt 551.

Means is preferably provided under the control of the operator for shifting the guide plate or shunt 525 so that it will aline with either of the slideways 456, 462 which direct the strips to the stacking supports 454, 452 respectively. For this purpose the guide plate or shunt 525 is mounted rotatably on the shaft 532 and has a guide part below the shaft 532 so that it may be rocked to line up with either of the slideways 456, 462. For rocking the shunt 525 for the purpose just indicated there is secured to one of its ends a lever arm 552 to the lower end of which is connected pivotally the rod 374 which leads back to the hand lever 370 (Fig. 1), a turn buckle 554 being provided intermediate of the ends of the rod so as to make the latter extensible. It will be observed that the hand lever 370 controls the adjustment of the two sets of gages and that it also controls the position of the guide plate or shunt 525, thus making it possible for the operator to adjust simultaneously the gages which determine the width of the strips to be cut and at the same time shift the shunt so as to direct the severed strips to the proper stack. From another viewpoint, the shunt is controlled by the gaging means since the connections through the rod 374, lever 370 and rod 380 insure adjustment of the shunt in accordance with adjusting movements of the gaging means.

Power for operating the machine may be provided in accordance with any of the well-known arrangements for that purpose, that shown comprising an electric motor 560 (Fig. 1), the armature shaft 562 of which is adapted to be clutched through clutch mechanism with a shaft 566 in alinement with the armature shaft, the shaft 566 being provided with a worm 568 (Figs. 1 and 5) arranged to be constantly in mesh with a worm gear 570 on a short counter shaft 572 provided at its other end with a gear 574 which is arranged in mesh with a gear 576 on the main shaft 164. For operating the clutch connecting shafts 562, 566, there is provided a foot lever or treadle 580 (Fig. 1) which is secured to a shaft 582 having bearings in the frame of the machine and carrying at its other end fixedly secured thereto a lever 584 for shifting the clutch part 586 into clutching engagement with the clutch part 587 to cause operation of the machine. When the treadle 580 is released it is moved upwardly by the spring 590 and the clutch is thereby disconnected and a brake applied. For holding the treadle in depressed clutch operating position there is provided a hold down consisting of a lock 592 pivoted at 594 (Fig. 15) on a bracket or post 595 and having a shoulder 596 adapted to engage over a tread portion 598 on the treadle 580. When it is desired to lock the treadle 580 in depressed operative position, the lock 592 can be moved to engage over an edge portion of the tread 598 by pressure against the contact plate 600. In this movement the spring 602 is placed under the tension of extension. Hence to release the treadle from the lock 592, it is necessary merely to depress the treadle a little farther, then the spring 602 will operate to withdraw the lock and hold it in inoperative position. In order to insure that the treadle lever 580 will not move upwardly to release the clutch 586 until the cross head 142 and the head 180 have arrived at their upper work-receiving positions, the treadle lever 580 has an extension 604 beyond the shaft 582 which extension is provided with a roll 606 (Figs. 1 and 5) with which there cooperates a cam wheel 608 on the shaft 164 to permit the lever 580 to rise only at the proper time. In other words the cam wheel 608 has a cut out portion in its periphery, as indicated at 610 (Fig. 5) into which the roll 606 can drop to permit upward movement of the treadle lever 580 under the action of the spring 590. It is obvious that the treadle lever 580 can be kept depressed by the lock 592 and the machine operated for any desired length of time.

Referring to Figs. 16, 17 and 18, it will be observed that the table or work support 22 is provided with two indicator plates 620, 622 for the purpose of assisting the operator in determining the number of strips of different widths which may be cut from the sheet S with the minimum of waste material remaining. If the rear edge of the sheet S were always straight across but one of the plates would be necessary. Since the rear edge is often times irregular in shape two plates are provided, the reading being taken from that plate covered in part by the edge portion which is the shorter distance from the cutting knife for the material. If desired, an indicator plate 624 (Fig. 18) may be substituted for the plate 622, with the plate in a vertical plane attached to the side or face of the gage or guard plate 28 in which position it is not covered at all by the sheet S and is, therefore, easier to read. The numerals from 1 to 6 indicating lines on the indicator plates 620, 622, 624 represent the number of strips of the minimum standard width which may be cut from the sheet S most advantageously, to be followed by the cutting of the wider strip for which the machine is set, and leave as a result of the cutting operations the minimum waste remainder. In other words, the indicator plate here used bears a tabulation which is the result of careful calculations as to the smallest number of the desired narrow width of strip which can be secured from sheets of material, within a given range of lengths of which the maximum is approximately 42 inches in length, when it is desired to produce the wider strips in quantity in preference over the narrower strips which are also cut from the sheet to utilize all of the material to the best advantage and leave the smallest waste remainder. By putting these calculations in the form of a tabulation on plates secured to the work support the workman is relieved of the necessity of making any calculation as to the manner of cutting the particular sheet in hand. All he needs to do is to place the sheet upon the table and observe the line on the plate 620 or 622 which is just within the edge portion nearest to the gages 230. The numeral opposite this line will indicate the number of strips of the narrower width which should be cut before throwing the gages over to cut the wider width of strips. Preferably the numbers on the plate indicate the minimum number of narrow strips to be cut first. Since the operator has to count the reciprocations of the cutter in order that he may throw the lever to initiate the cutting of the wider strips at the proper time, it is an advantage to count the lesser number of strips. After the lever is shifted to cut the wider strips the operator is free to attend to other matters.

If the demand is for narrow strips, plates similar to the plates 620, 622, 624 will be substituted for these plates, bearing numbers and lines similarly arranged, the numbers indicating, however, the number of the wider strips which should be cut first before shifting the gages 230 to cause the cutting of the desired narrower strips for which the machine is set. Consequently, the plates 620, 622, 624 are secured detachably in place on the work support 22 and on the gage plate 28. It will be obvious that after running the machine for a time, utilizing the indicator plates 620, 622, a sufficient quantity of the wider strips would be obtained since they will be in excess of the narrower strips cut from these same sheets. Hence, the other indicator plates by which wider strips are cut first from the sheets and in lesser quantity than the narrower strips will be employed in accordance with the demand at the time. It will be observed that each sheet S is measured not in inches but in terms of the number of strips obtainable from a sheet with a minimum amount of waste, the strips being of standard widths with regard to the uses to which the material is to be put.

In operating with the machine the operator will place a sheet S upon the table 22 and insert the forward edge of the sheet in place beneath the cutter 140 far enough to insure a straight edge being cut with the least waste of material. The treadle 580 is then depressed long enough to cause a single revolution of the operating shaft 164, whereupon the cutter 140 descends to straight edge the sheet and rises again to its upper position of rest. With the sheet resting on the bed in the position that it occupied during this trimming operation the operator observes the reading on the proper indicator plate 620 or 622, and is thus informed as to the number of operations of the machine with the gages 230 set for the narrow strip. He then releases the feed member 20 by operating the handle 104 to release the feed chain 26 so that the feed member 20 immediately moves into contact with the rear edge of the sheet S. The treadle 580 is then depressed and locked in its depressed position through the operation of the lock 592 as above described. The machine immediately operates to cut strips of the narrower width of the two for which the machine is set, the operator keeping track of the number of descents of the cutter 140 so that he may throw the handle 370 over to the right (in Fig. 1) to initiate the cutting of the wider strips at the proper time, the machine running continuously until all of the sheet is used up. At the last cut the operator releases the treadle 580, simply by stepping thereon, and introduces a new sheet with the forward end of which he shoves the waste piece at the rear of the previous sheet forwardly toward the gages so that it is carried away by the feed belts beyond the plane of the cutter 140. As soon as the last cut was made the feed member 20 was reutrned to initial position in the manner already described so that the operator can place his sheet on the table and perform the necessary operations preliminary to the cutting of the new sheet.

Having described my invention, what I claim as new and desire to secure by Letters Patent of the United States is:—

1. In a machine of the character described, a cutter for cutting sheet material into strips of predetermined width, a cutter for butting the strips, means for transferring the strips in succession from one cutter to the other and a plurality of means operating alternately for locating the material first for one and then for the other cutting operation.

2. In a machine of the character described, a cutter for severing strips of predetermined width from sheets of material, a cutter for butting the strips, means for transferring the strips from the first to the second cutter, means for simultaneously moving the cutters so that they operate in rapid succession to sever and butt the strips, and gages for the cutters alternately projectable to position the material for the cutting operations.

3. In a machine of the character described, a cutter for severing strips of predetermined width from sheet material, a cutter for butting the strips, means for feeding the sheet material to the first cutter and the strips to the second cutter, a gage mechanism for positioning the work for each cutter, and means for projecting the gage mechanisms into, and withdrawing them from, the path of the work.

4. In a machine of the character described, a cutter for severing strips from sheet material, a cutter for butting the strips in succession as they are severed by the first cutter, a set of gages for positioning the sheet for the operation of the first cutter, a set of gages for positioning the strip for the operation of the second cutter, and means for alternately projecting and retracting the sets of gages in time relation to each other.

5. In a machine of the character described, means for cutting sheet material into strips through a given range of predetermined widths, a gage mechanism under the control of the operator for determining the widths of the strips, means for stacking the strips in piles according to the widths of the strips, and means for simultaneously adjusting the gage mechanism and controlling the stacking means for the strips.

6. In a machine of the character described, means for cutting sheet material into strips through a given range of predetermined widths, a gage mechanism under the control of the operator for determining the widths of the strips, means for stacking the strips in piles according to the widths of the strips, a shunt mechanism for directing the strips to the proper pile, and means under the control of the operator for simultaneously adjusting the gage mechanism and the shunt mechanism so that the strips of different widths are cut and directed to the proper piles.

7. In a machine of the character described, means for cutting sheet material into strips through a given range of predetermined widths, a gage mechanism under the control of the operator for determining the widths of the strips, means for stacking the strips in piles according to the widths of the strips, a shunt mechanism for directing the strips to the proper piles, connections between the gage and the shunt mechanisms, and a manually operable member for simultaneously shifting the gage mechanism and the shunt mechanism so that strips cut of a given width are guided to the proper pile for that width.

8. In a machine of the character described, a cutter for severing strips from sheet material, a cutter for butting the strips in succession as they pass from the first cutter, gaging means for positioning the sheet with respect to the first cutter, gaging means for positioning the strips with respect to the second cutter, a plurality of supports upon which the strips are stacked in accordance with the widths of the strip, means for transferring the strips from the strip butting means to the supports, and means for simultaneously adjusting both the gaging means and for directing the strips to the proper support for the width of strip gaged by the adjusted gaging means.

9. In a machine of the character described, a cutter for severing strips from sheet material, a cutter for butting the strips in succession as they pass from the first cutter, gaging means for positioning the sheet with respect to the first cutter, gaging means for positioning the strips with respect to the second cutter, a plurality of supports upon which the strips are stacked in accordance with the widths of the strips, means for transferring the strips from the strip butting means to the supports, a shunt mechanism for directing the strips to the proper support, and means under the control of the operator for adjusting simultaneously both gaging means and the shunt mechanism so that the strips gaged by the adjusted gaging means are delivered to the proper support.

10. In a machine of the character described, a cutter for severing strips from sheet material, gaging means for positioning the sheet for the operation of the cutter, manually operable means for adjusting the gaging means in a direction toward and from the cutter to vary the width of the strips, and means operable before the cutting operation for insuring that the gaging means is moved to predetermined position so as to provide for the cutting of strips of standard widths.

11. In a machine of the character described, a cutter for severing strips from sheet material, gaging means for positioning the sheet for the operation of the cutter, manually operable means for adjusting the gaging means in a direction toward and from the cutter to vary the width of the strips, and means automatically operable for moving the gaging means to proper position before the operation of the cutter thereby insuring the cutting of strips of predetermined widths.

12. In a machine of the character described, a cutter for severing strips of various widths from sheet material, a gaging means for determining the widths to be cut, means for discharging the strips selectively at a plurality of stations according to the widths of the strips, and means controlled by the gaging means for selecting the station at which the strips being cut may be discharged.

13. In a machine of the character described, a cutter for severing strips from sheet material, a plurality of supports upon which the strips may be stacked in accordance with the widths of the strips, means for transferring the strips from cutting position selectively to the different supports, and means under the control of the operator for determining the support upon which the strips being cut will be delivered.

14. In a machine of the character described, a cutter for severing strips from sheet material, a plurality of supports for receiving the strips in accordance with their widths, means for conveying the strips from the cutters to the supports, a shunt mechanism introduced between the conveyor means and the supports for directing the strips to the proper supports, and means under the control of the operator for operating the shunt mechanism.

15. In a machine of the character described, a cutter for severing strips from sheet material, a plurality of supports for receiving the strips in accordance with their widths, means for conveying the strips from the cutters to the supports, a shunt mechanism introduced between the conveyor means and the supports, and a manually operable member connected to the shunt mechanism for adjusting the same so that the operator may selectively determine the support to which the strips will be delivered.

16. In a machine of the character described, a cutter for severing strips from sheet material, a plurality of supports for receiving the strips in accordance with their widths, means for conveying the strips from the cutters to the supports, a shunt mechanism introduced between the conveyor means and the supports, and means operable before each cutting operation for insuring that the shunt mechanism has been moved by the operator to its complete operative position.

17. In a machine of the character described, a cutter for severing strips from sheet material, a plurality of supports for receiving the strips in accordance with their widths, means for conveying the strips from the cutters to the supports, a shunt mechanism introduced between the conveyor means and the supports, and means automatically operable for insuring that the shunt mechanism has been moved to its complete operative position.

18. In a machine of the character described, a cutter for severing strips from sheet material, gaging means adjustable to vary the width of the strips, a plurality of supports upon which the different widths of strips are stacked, means for transferring the strips from the cutter to the supports, and a shunt mechanism between the supports and the conveying means operable to direct the strips to the proper support according to the width of the strips, said mechanism being spaced from the conveying means a distance to permit the escape of scrap or undersized strips so that only perfect strips are delivered to the supports.

19. In a machine of the character described, a cutter for severing sheet material into strips, a gaging means for positioning the sheet for the operation of the cutter, a presser foot operative to engage the sheet material and to hold it momentarily against the upward drag of the cutter as it rises following the cutting operation, and means for feeding the sheet into position against the gaging means.

20. In a machine of the character described, a cutter for severing strips from sheet material, gaging means beyond the cutter for positioning the forward end of the sheet prior to a cutting operation, yieldingly operated feeding means for moving the sheet into position against the gaging means, and a presser foot mechanism operative to clamp the sheet prior to the cutting operation and to retain it subsequent to the operation during the rising movement of the cutter and until the gaging means has been retracted to permit the discharge of the strip just severed.

21. In a machine of the character described, a stop or abutment for positioning sheet material, means for moving the sheet into engagement with the stop or abutment comprising spring means for operating the moving means and causing it to hold the material yieldingly against the stop or abutment, means for positively returning the moving means to initial position and storing up energy in the spring means, and means automatically operative to control the last-mentioned means.

22. In a machine of the character described, a stop or abutment for locating sheet material, a member for contacting with the rear edge of the sheet to move it and press it yieldingly against the stop, a spring for moving said member in the feeding direction, power means for moving the member to initial position, a clutch for controlling the power means, and a trip lever located in the path of the member for controlling said power means.

23. In a machine of the character described, a stop or abutment for locating sheet material, a member for contacting with the rear edge of the sheet to move it and press it yieldingly against the stop, a spring for moving said member in the feeding direction, power means for moving the member to initial position, a latch operated by the member upon its return to initial position for holding the member in said position, and a trip member located in the path of said member for controlling said power means.

24. In a machine of the character described, a stop or abutment for locating sheet material, a member for contacting with the rear edge of the sheet to move it and press it yieldingly against the stop, a spring for moving said member in the feeding direction, power means for moving the member to initial position, a manually operable latch for retaining said member in its initial position, and a trip member located in the path of said member for controlling the power means.

25. In a machine of the character described, means for cutting sheet material into strips of predetermined width, means for butting the strips, means for transferring the strips from the cutting to the butting means, and means operating in succession to locate the material for the cutting and butting operations.

26. In a machine of the character described, a cutter for severing strips of various predetermined width from sheets of material, a cutter for butting the strips, means for transferring the strips from the first to the second cutter, and means having a variable position according to the width of the strips for positioning the latter for the butting operation.

27. In a machine of the character described, a cutter for severing strips of predetermined width from sheet material, a cutter for butting the strips, means for feeding the sheet material to the first cutter and the strips to the second cutter, a gage mechanism for positioning the work for each cutter, and means for simultaneously adjusting the gage mechanisms with respect to the cutters.

28. In a machine of the character described, means for cutting sheet material into strips through a given range of predetermined widths, a gage mechanism under the control of the operator for determining the widths of the strips, means for discharging the strips in different paths according to the widths of the strips, and means for simultaneously adjusting the gage mechanism and the discharging means so as to cut strips of a desired width and cause them to be discharged at the proper station.

29. In a machine of the character described, means for cutting sheet material into strips through a given range of predetermined widths, a gage mechanism under the control of the operator for determining the widths of the strips, means for discharging the strips in different paths according to the widths of the strips, a shunt mechanism for directing the strips to the proper discharge station, and means under the control of the operator for simultaneously adjusting the gage mechanism and the shunt mechanism so that the strips of different widths are cut and directed to the proper discharge stations.

30. In a machine of the character described, a cutter for severing strips from sheet material, a cutter for butting the strips in succession as they pass from the first cutter, gaging means for positioning the sheet with respect to the first cutter, gaging means for positioning the strips with respect to the second cutter, a plurality of supports upon which the strips are stacked in accordance with the widths of the strips, means for transferring the strips from the strip butting means to the supports, a shunt mechanism for directing the strips to the proper support, and means under the control of the operator for adjusting simultaneously the first gaging means and the shunt mechanism so that the strips gaged by the adjusted gaging means are delivered to the proper support.

31. In a machine of the character described, a cutter for severing strips from sheet material, gaging means for positioning the sheet for the operation of the cutter, means for adjusting the gaging means in a direction toward and from the cutter to vary the width of the strips, and means for insuring that the gaging means is moved by the adjusting means to predetermined position so as to provide for the cutting of strips of standard widths.

32. In a machine of the character described, a cutter for severing strips from sheet material, a gage adjustable for determining variations in the widths of the strips, means for discharging the strips selectively and in accordance with their widths at a plurality of stations, and interconnected means under the control of the operator for adjusting the gage and for selecting the station at which each strip may be discharged.

33. In a machine of the character described, a cutter for severing strips from sheet material, a plurality of supports upon which the strips may be stacked, means for transferring the strips from cutting position selectively to the different supports, and means under the control of the operator for determining the support upon which the strips being cut will be delivered.

34. In a machine of the character described, a cutter for severing strips from sheet material, a plurality of supports for receiving the strips, means for conveying the strips from the cutters to the supports, a shunt mechanism introduced between the conveyor means and the supports, and means for insuring that the shunt mechanism has been moved by the operator to its complete operative position.

35. In a machine of the character described, a stop or abutment for positioning sheet material, means for moving the sheet into engagement with the stop or abutment comprising spring means for operating the moving means and causing it to hold the material yieldingly against the stop or abutment, means for positively returning the moving means to initial position and storing up energy in the spring means, and means for controlling the last-mentioned means.

36. In a machine of the character described, a member for contacting with the rear edge of a sheet of material to move it into the field of operations, a spring for moving said member in the feeding direction, power means for moving the member to initial position, a clutch for controlling the power means, and a trip member located in the path of the member for controlling said clutch.

37. In a machine of the character described, a member for contacting with the rear edge of a sheet of material to move it into the field of operations, a spring for moving said member in the feeding direction, power means for moving the member to initial position, a latch operated by the member upon its return to initial position for holding the member in said position, and a trip member located in the path of said member for controlling said power means.

38. In a machine of the character described, a member for contacting with the rear edge of a sheet of material to move it into the field of operations, a spring for moving said member in the feeding direction, power means for moving the member to initial position, a manually operable latch for retaining said member in its initial position, and a trip member located in the path of said member for controlling the power means.

39. In a machine for cutting sheet material into strips, a cutter for severing strips from sheet material, a conveyor for carrying the strips away from the cutter, and a shutter operative to receive and deliver strips of a plurality of standard widths from the conveyor and reject those below the minimum standard width.

40. In a machine of the character described, means for cutting sheet material into strips and for straight edging the sheet prior to the cutting of the strips, a conveyor for carrying the strips and the scrap away from the cutter, and a shutter plate mounted to yield under the impact of a strip of standard width to permit the strip to pass and to reject pieces of scrap or strips below standard width.

41. In a machine of the character described, a cutter for straight edging a sheet of material and for cutting the sheet into strips, a conveyor for carrying the strips and the scrap away from the cutter, a chute for guiding the strips to a discharge station, and a shutter movable by the strips as they enter the upper end of the chute, said shutter serving to hold back the scrap and also any strip of less than standard width.

42. In a machine of the character described, a cutter for straight edging sheet material for cutting the sheet into strips, a conveyor for moving the strips and the scrap away from the cutter, and a shutter mechanism spaced from the end of the conveyor, said mechanism comprising upper and lower plates which move in opposite directions to admit a strip of standard width.

43. In a machine of the character described, a cutter for straight edging sheet material for cutting the sheet into strips, a conveyor for moving the strips and the scrap away from the cutter, a shutter mechanism spaced from the end of the conveyor, said mechanism comprising upper and lower plates which move in opposite directions to admit a strip of standard width, and means for yieldingly retaining the plates in position so as to reject scrap pieces and strips below the standard widths.

44. In a machine of the character described, a cutter for straight edging sheet material for cutting the sheet into strips, a conveyor for moving the strips and the scrap away from the cutter, a shutter mechanism spaced from the end of the conveyor, said mechanism comprising upper and lower plates which move in opposite directions to admit a strip of standard width, means for retaining the plates in position so as to reject scrap pieces and strips below the standard widths, and means for retarding the closing movement of the plates so as to prevent a gripping of the strip before it can pass on from the shutter mechanism.

45. In a machine of the character described, a cutter for straight edging sheet material for cutting the sheet into strips, a conveyor for moving the strips and the scrap away from the cutter, a shutter mechanism spaced from the end of the conveyor, said mechanism comprising upper and lower plates which move in opposite directions to admit a strip of standard width, means for yieldingly retaining the plates in position so as to reject scrap pieces and strips below the standard widths, a dash pot, and connections from the shutter mechanism to the dash pot whereby the latter retards the closing movement of the shutter.

46. In a machine of the character described, a cutter for severing strips from sheet material, a cutter for butting the strips, gaging means for positioning the sheet with respect to the first cutter, gaging means for positioning the strips with respect to the second cutter, and means under the control of the operator for adjusting simultaneously both gaging means to vary the width of the strips to be severed and butted.

47. In a machine of the character described, a cutter for severing strips from sheet material, gaging means for positioning the sheet for the operation of the cutter, means for adjusting the gaging means in a direction toward and from the cutter to vary the width of the strips, and means for stacking the strips in piles according to the width of the strips.

48. In a machine for operating on sheet material, a work support, means for operating on the work, and an indicator plate on the work support located at such a distance from the operating means that the rear edge of the sheets will overlap the indicator plate, said indicator plate having lines and figures to measure the sheets in terms of the width dimension of the spaces between succesive lines of operation on the work.

49. In a machine for cutting sheet material into strips, a support for the sheets, a cutter for severing strips from the sheets, and an indicator plate on the work support located at such a distance from the cutter that the rear edges of the sheets will overlap the indicator plate, said indicator plate having lines and figures to measure the sheet in terms of the width of the strips it is desired to cut from the sheet.

50. In a machine for operating upon sheet material, a support for the sheets, a tool for operating on the material, and an indicator plate on the work support at such a distance from the tool that the rear edges of the sheets will overlap the indicator plate, said indicator plate having lines and figures to measure the sheet in terms of the distances between successive points of operation in the direction of movement of the work.

51. That improvement in methods of cutting sheet material into blanks of predetermined widths which comprises calculating the number of blanks of uniform or different given widths which may be cut from sheets of different given sizes with a minimum of waste, placing on the table of a cutting machine lines and figures indicating the number of strips, either wide or narrow, to be cut first from the sheet, the said lines and figures being positioned to serve as a measuring means for the sheet in terms of strips, and then proceeding to cut the strips as indicated.

52. That improvement in methods of cutting sheet material into blanks of predetermined widths which comprises calculating the number of blanks of uniform or different given widths which may be cut from sheets of different given sizes with a minimum of waste, making a tabulation with reference to one width only of the several widths which entered into the calculation, and utilizing the tabulation to measure the sheets in units corresponding to said width of strip before proceeding to cut the sheets.

53. That improvement in methods of cutting sheet material into blanks of predetermined widths which comprises calculating the number of blanks of uniform or different given widths which may be cut from sheets of different given sizes with a minimum of waste, making a tabulation of lines and figures indicating the number of strips, either wide or narrow, to be cut first from the sheet, the said lines and figures being positioned to serve as a measuring means for the sheet in terms of strips, and then proceeding to cut the strips as indicated.

54. In a machine for operating upon sheet material of indefinite length, a support for the material, a tool for operating upon the material, mechanism for feeding the material step-by-step toward the tool, means for varying the length of the feed steps, and means for indicating the number of operations to be performed by the tool before the length of the feed steps is varied.

55. In a machine for cutting sheet material into strips, a support for the material, a cutter for operating upon the material, mechanism for feeding the material step-by-step toward the cutter, means for varying the length of the feed steps, and means for indicating the number of operations of the cutter to be performed upon the material before the length of the feed steps is varied, whereby the sheet material may be cut into strips of different widths with a minimum of waste.

In testimony whereof I have signed my name to this specification.

RALPH C. SIMMONS.